UNITED STATES PATENT OFFICE 2,653,947

PROCESS FOR PREPARING THE N-CAR- BOXYPHENYLALANINE ANHYDRIDES

John B. Ott, Dayton, Ohio, assignor to Monsanto Chemical Company, St. Louis, Mo., a corporation of Delaware No Drawing. Application June 23, 1950, Serial No. 170,053

12 Claims. (Cl. 260—307)

This invention relates to a new method of preparing amino acid N-carboxy anhydrides. More specifically the invention relates to a new and more economical procedure for preparing the N-carboxyphenylalanine anhydrides.

The N-carboxy anhydrides of phenyl alanine has been prepared heretofore, but the methods used are complex and not readily adaptable to industrial practice. In accordance with the prior art method the amino acid is first treated with an ester of chloroformic acid in an aqueous alkaline solution, thereafter the resulting product is extracted with ether, finally converted to the N-carboxy anhydride by reaction with thionyl chloride, and extracted from the reaction residue with ether or other solvents. Such procedure is obviously tedious and the numerous operations induce the formation of low yields and impure product.

The purpose of the present invention is to provide a more economical procedure for the preparation of N-carboxy-$\beta$-phenyl-$\alpha$-alanine anhydride. A further purpose is to prepare the N-carboxy anhydride of phenylalanine in high yields of substantial purity.

It has now been found that the N-carboxy anhydride of phenylalanine may readily be prepared by a simple procedure. The pyhenylalanine is dispersed in an organic liquid medium, which medium is a liquid at some temperature between 100° C. and 160° C., and is a solvent for the N-carboxyphenylalanine anhydride at elevated temperatures, but a poor solvent at room temperature. The reaction is initiated by converting the amino acid to the hydrochloride salt and then treating the suspension with phosgene until the suspended salt dissolves. By cooling, the N-carboxy anhydride crystallizes from the organic reaction medium, leaving side reaction products in the mother liquor.

In the practice of this invention it has been found that suitable compounds are those having the desired solvent properties as represented by the structural formula:

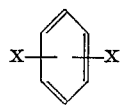

wherein X may be hydrogen, halogen or alkyl having up to four carbon atoms, but at least one X radical is not hydrogen, and the said compounds are liquids at some temperature between 100 and 160° C. at atmospheric pressure. Compounds satisfying these requirements and therefore operative in the practice of this invention are: o-xylene, m-xylene, p-xylene, any of the isomeric methyl ethyl benzenes, ethyl benzene, cumene, cymene, o-dichlorbenzene, m-dichlorbenzene, chlorobenzene, o-dibrombenzene, bromobenzene and the various mixed alkyl halobenzenes.

The preferred practice of this invention involves the addition of the solid phenylalanine to the organic liquid in which it is not soluble. The suspension so prepared is then treated with hydrogen chloride to generate the amino acid hydrochloride, which remains in suspension in the organic medium. Gaseous phosgene is then passed through the reaction medium at a temperature between 100° C. and 160° C., until the suspension is converted into a solution. At this point various insoluble impurities may be separated by filtering the hot solution. The solution is then cooled to room temperatures, or lower by cold water, ice or freezing mixture bath. The amino acid anhydride may then be separated by filtering the cooled mixture. Soluble impurities remain dissolved in the filtrate.

Since the N-carboxyphenylalanine anhydride is reactive with water it is desirable to use anhydrous or substantially anhydrous solvents. Improved yields may also be secured by adding to the cooled reaction mixture an organic liquid in which the N-carboxyphenylalanine anhydride has low solubility, for example hexane, diethyl ether, and carbon tetrachloride.

An alternative method of preparing N-carboxyphenylalanine anhydride may involve the separate preparation of the amino acid hydrochloride by any of the known methods and thereafter suspending the said hydrochloride salt in one of the suitable solvents as described above, and treating it with phosgene under the defined conditions. This method is equally effective and under some circumstances may provide pure products, especially if the hydrochloride is refined by recrystallization.

The N-carboxyphenylalanine anhydride prepared in accordance with this improved method is of unusual purity and may be used in the preparation of polypeptide resins or artificial polypeptides for food and medicinal use. The method is operative in the preparation of the d-optically active, l-optically active or the racemic dl-optically inactive mixture.

Further details of this invention are set forth with respect to the following examples.

Example 1

Thirty parts by weight of phenylalanine were suspended in 350 parts of chlorobenzene. The mixture was treated with hydrogen chloride until the temperature developed by the heat of reaction subsided, this being established as a sign of complete salt formation. The suspension so produced was then treated with an excess of phosgene while refluxing the mixture for one hour at 110 to 120° C. At this time the slurry was converted into a light yellowish solution. The solution was filtered hot and permitted to cool. The precipitated solid was separated by filtration and washed with a small quantity of cold chlorobenzene, and finally with hexane. The product so obtained was identified as dl-phenylalanine N-carboxy anhydride.

*Example 2*

A mixture of 320 parts by weight of o-dichlorbenzene and 30 parts of dl-phenylalanine were treated wih hydrogen chloride in an excess until the amino acid was entirely converted to the hydrochloride. The mixture was heated in the presence of a stream of gaseous phosgene at a temperature which increased rapidly to 95° C. in five minutes, 110° C. in ten minutes and rose to a maximum of 165° C. in 25 minutes. At this point the slurry became a solution which was filtered hot. Upon cooling a large quantity of crystalline material was precipitated. The salt was separated by filtering, washed with o-dichlorbenzene and then hexane. The product so separated was identified as N-carboxyphenylalanine anhydride.

The invention is defined by the following claims:

1. The method of preparing the N-carboxy anhydride of β-phenyl-α-alanine, which comprises dispersing phenylalanine in a compound having the structural formula:

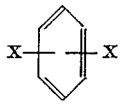

wherein the X radicals are selected from the group consisting of hydrogen, halogen and alkyl radicals having up to four carbon atoms, not more than one of said radicals being hydrogen, and said compounds being liquids at temperatures between 100 and 160° C., reacting the dispersion with hydrochloric acid, treating the dispersion so formed with phosgene between 100 and 160° C., cooling the resulting solution, and separating the precipitated N-carboxyphenylalanine anhydride.

2. The method defined in claim 1, wherein the reaction medium is xylene.
3. The method defined by claim 1, wherein the reaction medium is o-dichlorbenzene.
4. The method defined in claim 1, wherein the reaction medium is chlorobenzene.
5. The method defined in claim 1, wherein the reaction medium is ethylbenzene.
6. The method defined in claim 1, wherein the reaction medium is methyl ethylbenzene.
7. The method of preparing the N-carboxy anhydride of β-phenyl-α-alanine, which comprises dispersing the hydrochloride of phenylalanine in a compound having the structural formula:

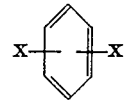

wherein the X radicals are selected from the group consisting of hydrogen, halogen and alkyl radicals having up to four carbon atoms, where not more than one of said radicals being hydrogen, and said compounds being liquids at temperatures between 100 and 160° C., treating the dispersion so formed with phosgene between 100 and 160° C., cooling the resulting solution, and separating the precipitated N-carboxyphenylalanine anhydride.

8. The method defined in claim 7, wherein the reaction medium is xylene.
9. The method defined in claim 7, wherein the reaction medium is o-dichlorbenzene.
10. The method defined in claim 7, wherein the reaction medium is chlorobenzene.
11. The method defined in claim 7, wherein the reaction medium is ethylbenzene.
12. The method defined in claim 7, wherein the reaction medium is methyl ethylbenzene.

JOHN B. OTT.

References Cited in the file of this patent

Erdmann Berichte, vol. 32, pp. 2159–2172 (1899).
Nature, January 28, 1950, p. 152.
Nature, April 22, 1950, p. 647.